March 5, 1963     C. C. FARONI ET AL     3,079,830
LIGHT WEIGHT LOCK NUT HAVING INTERNAL WRENCHING SURFACES
Filed June 26, 1958
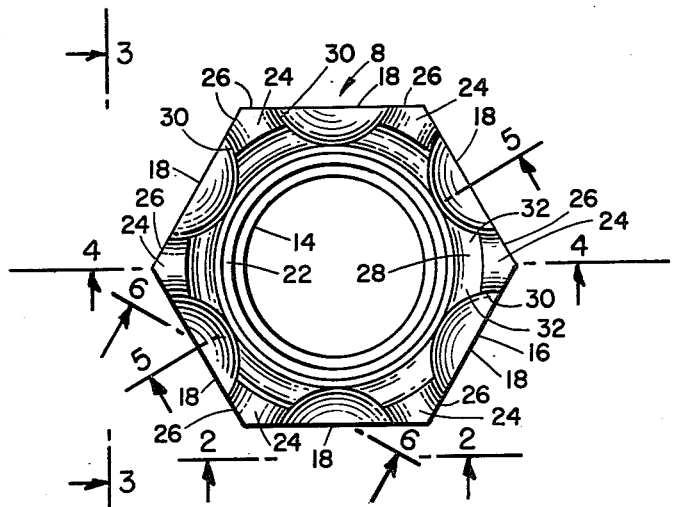
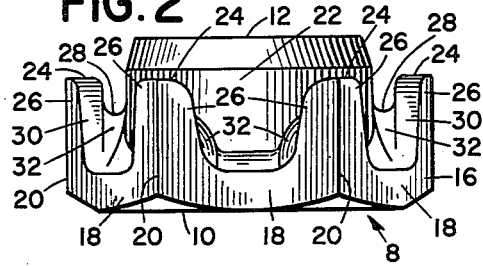 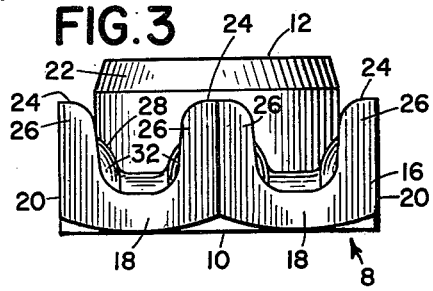
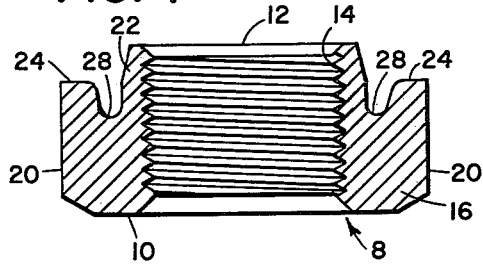 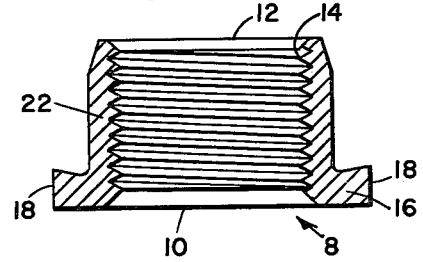
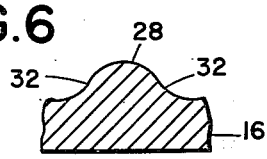
INVENTORS
CHARLES C. FARONI
MICHAEL F. MIHALY
*Richard A. Craig*
ATTORNEY

United States Patent Office 3,079,830
Patented Mar. 5, 1963

3,079,830
LIGHT WEIGHT LOCK NUT HAVING INTERNAL WRENCHING SURFACES
Charles C. Faroni, Summit, and Michael F. Mihaly, Union, N.J., assignors to Elastic Stop Nut Corporation of America, Union, N.J., a corporation of New Jersey
Filed June 26, 1958, Ser. No. 744,786
1 Claim. (Cl. 85—32)

This invention relates to fastening devices and more particularly to nuts and still more particularly to a one-piece metal self-locking nut.

It is well known that to achieve maximum nut tensile strength for a given volume of metal in a nut, the optimum shape would be a tube having at one end an external annular flange. The tube would be internally threaded and the flange would function as the base of the nut, providing adequate bearing area for the axial compressive load to which the nut is subjected in use and resisting the high hoop stresses at the nut base.

However, a nut embodying the optimum design is subject to the practical disadvantage that it can not be conveniently wrenched with standard wrenches. Therefore additional structure must be included to provide wrenching surfaces or abutments. Such additional structure must be as efficient as possible, in order to maintain the best possible relationship between nut strength and nut weight.

By the present invention a nut is provided which at the same time can be conveniently wrenched externally by a standard open-end wrench and which also is of extremely low weight with respect to its strength.

A nut in accordance with the invention can be alternatively wrench by other means in applications in which an open-end wrench can not be used, as for example where there is insufficient clearance between the nut and adjacent structure.

Thus important objects of the invention are to provide a nut possessing the advantages set forth above.

The foregoing and other objects and advantages will appear more clearly from the following description of a preferred form of the invention and the accompanying drawings thereof in which:

FIG. 1 is a plan view of a nut in accordance with the invention;
FIG. 2 is a view on line 2—2 of FIG. 1;
FIG. 3 is a view on line 3—3 of FIG. 1;
FIG. 4 is a view on line 4—4 of FIG. 1;
FIG. 5 is a view on line 5—5 of FIG. 1; and
FIG. 6 is a view on line 6—6 of FIG. 1.

The drawings illustrate a one-piece nut 8 having a first end 10 providing nut bearing area and a second end 12 and an internal thread 14 defining a nut axis. Also included is a base portion 16 extending from end 10 a first predetermined axial distance toward end 12 and having a plurality (six as shown) of identical external wrenching surfaces 18 equally spaced from and parallel to and facing away from the nut axis. Surfaces 18 define in planes perpendicular to the nut axis through base portion 16 circumferentially uninterrupted identical regular polygons. Since nut 8 has six surfaces 18, these polygons are hexagons. Adjacent pairs of surfaces 18 intersect each other at corners 20 of base portion 16 to form lines parallel to the nut axis.

Nut 8 also includes an imperforate tubular portion 22 integral with base portion 16 and extending therefrom to end 12. Wrenching surfaces 18 define a cylindrical imaginary surface tangential thereto and concentric with the nut axis. Tubular portion 22 is entirely within this cylindrical surface.

Thread 14 is at least partly in tubular portion 22 and as shown is partly in tubular portion 22 and partly in base portion 16.

Nut 8 further includes a post 24 integral with each corner 20 of base portion 16, there thus being in the illustrated example six such posts, and extending therefrom a second predetermined distance toward end 12. Each post 24 has a pair of external wrenching surfaces 26 coplanar with and providing continuations of wrenching surfaces 18 of base portion 16. Posts 24 are spaced from each other circumferentially of nut 8 and are spaced radially from tubular portion 22.

Posts 24, which are as shown identical, are substantially localized circumferentially of nut 8 to corners 20 of base portion 16 and adjacent pairs of posts 24 are separated by gaps subtending greater angles with respect to the nut axis than post 24.

The ends of posts 24 remote from base portion 16 define a plane which intersects tubular portion 22 between end 12 and base portion 16.

Additionally, nut 8 as shown includes a projection or web portion 28 radially between tubular portion 22 and each post 24 (there thus being in nut 8 six projections 28) and integral therewith and with tubular portion 22 and with base portion 16 and extending a third predetermined distance toward end 12 from base portion 16. Preferably and as shown the second predetermined distance is somewhat greater than the third predetermined distance. Also as shown projections 28 are circumferentially spaced from each other and are identical.

Posts 24 have additional wrenching surfaces 30 and projections 28 have additional wrenching surfaces 32 and additional surfaces 30 and 32 generally face in both directions circumferentially of nut 8.

Tubular portion 22 may be inwardly deformed to an elliptical configuration for a predetermined axial distance from end 12 to distort thread 14 and render nut 8 self-locking. For simplicity this is not shown. The wall of portion 22 is radially somewhat flexible in its deformed part, and for the desired flexibility portion 22 must have a certain minimum length between end 12 and projections 28. If the third predetermined distance were as great as the second predetermined distance the axial length of the nut would have to be increased, possibly beyond acceptable limits. Undesired weight would also be added. This is why, as stated, projections 28 preferably do not extend as far from base portion 16 as do posts 24.

Also, as best shown in FIG. 6, each projection 28 is is of greatest circumferential dimension adjacent base portion 16 and of least circumferential dimension remote from base portion 16 and is of generally tapering configuration therebetween.

Thus surfaces 18 and 26 provide external wrenching flats which may be engaged by a standard open-end wrench or a box wrench to turn nut 8, while surfaces 30 and 32 provide additional means adapted for engagement alternatively by a different wrench which in use would not extend radially outside the imaginary cylindrical surface defined by corners 20 of nut 8. Such different wrench may be on the order of a socket wrench and which may be especially designed for use with nut 8.

Thus, nut 8 can be installed (or removed) in locations where there is less clearance space between nut 8 and other structure than would be the case with a corresponding standard nut which is only wrenchable externally.

It is also possible to wrench nut 8 by means of a top spanner wrench if desired, in which case the lugs of the wrench would engage post surfaces 30.

It is to be noted further that nut 8, due to the gaps circumferentially between adjacent pairs of posts 24 and adjacent pairs of projections 28 and radially between posts 24 and tubular portion 22, is considerably lighter than a conventional solid nut of the same size. This weight reduction has been achieved without any sacrifice in performance.

Nut 8 can conveniently be made of A4037 cold heading quality steel and heat treated to develop desired strength.

The present invention furthermore makes it possible to locate the internal wrenching surfaces at more nearly the optimum places, with respect to the point of application of wrenching force and wrenching lever arm, than is the case with internally wrenchable prior art nuts.

Also, the wrenching surfaces of prior art nuts which are wrenchable either internally or externally are subject, when loaded, to distortion due to hoop stress. This distortion of prior art nuts occurs as a radial expansion at and near the nut base and possibly also as a radial contraction at locations axially adjacent the location of radial expansion. The distortion referred to has caused serious difficulty in wrenching prior art nuts both externally and internally. The present invention effectively overcomes this difficulty.

Many changes which will occur to those skilled in the art can be made without departing from the invention. Therefore the details of the disclosed example are not to be taken as limitations on the invention except as those details may be included in the appended claim.

What is claimed is:

A nut having a hexagonal base portion providing six circumferentially continuous external surfaces and six corners, a post integral with and extending axially from each said corner, each said post providing a pair of wrenching surfaces facing generally in opposite directions, said posts on the same side of said base portion, an internally threaded imperforate tubular portion integral with said base portion and extending axially from the same side thereof as said posts, and a web portion between and integrally connecting a portion only of the length of each said post and said tubular portion and integral with said base portion, each said web portion providing a pair of wrenching surfaces facing generally in opposite circumferential directions and of greatest circumferential dimension adjacent said base portion and of least circumferential dimension remote from said base portion and of generally tapering configuration therebetween, said tubular portion extending further from said base portion than said posts and said web portions and said thread normally out-of-round in said tubular portion further from said base portion than said web portions.

References Cited in the file of this patent

UNITED STATES PATENTS

| 332,540 | Law | Dec. 15, 1885 |
| 2,307,919 | Crabbs | Jan. 12, 1943 |

FOREIGN PATENTS

| 1,685 | Great Britain | Jan. 18, 1884 |
| 525,585 | Belgium | Jan. 8, 1954 |